United States Patent [19]
Friese

[11] 3,914,071

[45] Oct. 21, 1975

[54] ELECTRICALLY DRIVEN FAN

[75] Inventor: Karl E. Friese, Dover, N.H.

[73] Assignee: IMC Magnetics Corporation, Westbury, N.Y.

[22] Filed: Feb. 27, 1974

[21] Appl. No.: 446,582

[52] U.S. Cl............. 417/353; 184/6.27; 308/189 R; 310/90
[51] Int. Cl.²......................................... F04D 25/06
[58] Field of Search......... 417/353; 308/184, 95–96, 308/109, 240, 189; 277/187–189; 85/8.8; 184/88 R, 6.27; 310/90

[56] References Cited
UNITED STATES PATENTS

| | | |
|---|---|---|
| 2,487,802 | 11/1949 | Heimann.............................. 85/8.8 |
| 2,956,632 | 10/1960 | Forbush et al..................... 308/189 |
| 3,276,678 | 10/1966 | Saretzky............................. 417/353 |
| 3,378,192 | 4/1968 | Friese................................. 417/353 |
| 3,561,891 | 2/1971 | Saint-Amand...................... 417/353 |
| 3,703,221 | 11/1972 | Merkle............................. 308/187.1 |

Primary Examiner—C. J. Husar
Assistant Examiner—O. T. Sessions
Attorney, Agent, or Firm—Alan H. Levine

[57] ABSTRACT

A fan comprising a frame carrying a stationary cantilever shaft supporting a sleeve to which the fan impeller is fixed. Ball bearings are arranged between the shaft and sleeve. A cap covers the end of the sleeve farther from the fixed end of the shaft, and a curved snap ring pressing against the cap squeezes a gasket between the cap and the farther end edge of the sleeve. The inner surface of the sleeve is machined to provide shoulders against which the ball bearings are positioned.

4 Claims, 5 Drawing Figures

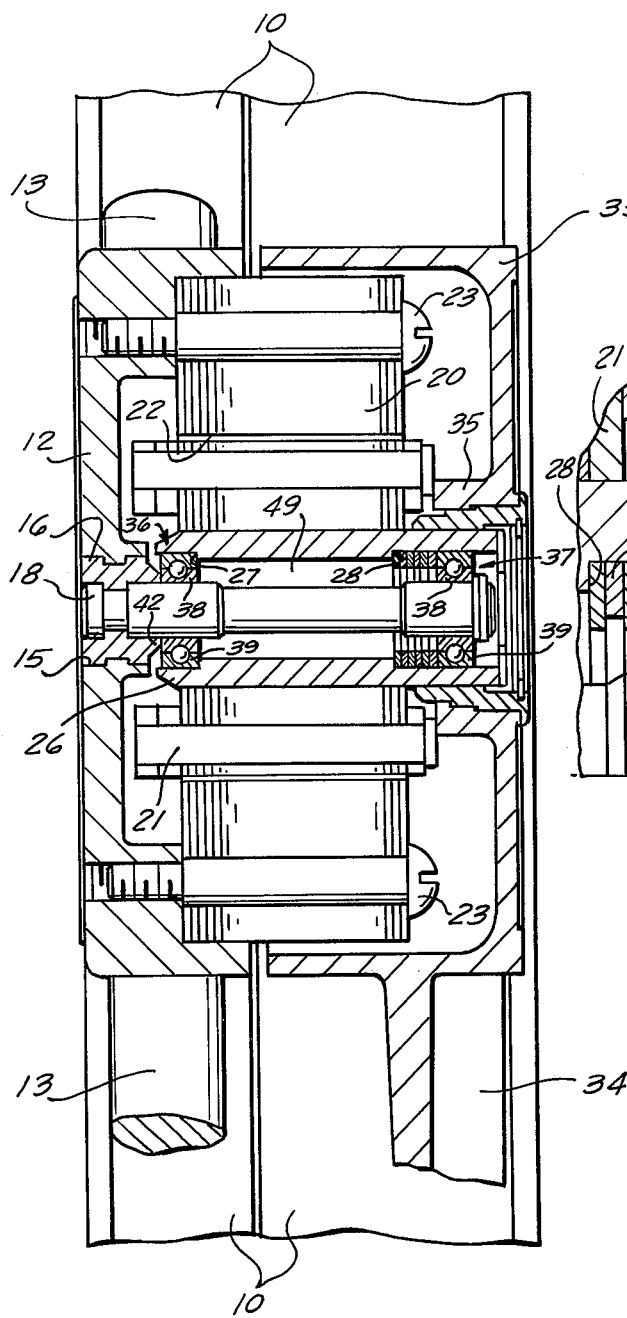

ELECTRICALLY DRIVEN FAN

This invention relates to electrically driven fans, and more particularly to such a fan employing ball bearings for rotatably supporting the fan impeller with respect to a mounting frame.

An electric motor must, of course, be provided for rotating the fan impeller. Preferably, an induction motor is used having an outer annular stator fixed to the fan frame, and an annular rotor rotatable within the stator. A sleeve fixed within the rotor surrounds a stationary shaft carried by the frame. Grease fills the space within the sleeve between the bearings, as well as the space between one of the bearings and a cap fitted over one end of the sleeve.

It is an object of the present invention to provide such a fan having a sealing arrangement for the end of the sleeve to prevent leakage of the grease and thereby eliminate or at least greatly minimize the need for relubrication.

It is another object of the invention to provide a fan of the type described wherein the interior of the sleeve is integrally formed with abutments to locate the positions of the ball bearings within the sleeve, thereby eliminating the need for separate abutment means.

It is another object of the invention to provide an arrangement whereby the sleeve, ball bearings, and shaft may be quickly and easily assembled.

Other objects and advantages of the invention will be apparent from the following description in which reference is made to the accompanying drawings.

In the drawings:

FIG. 2 is a fragmentary vertical cross-sectional view, on an enlarged scale, taken on line 2—2 of FIG. 1;

FIG. 3 is a fragmentary cross-sectional view, on an enlarged scale, of a portion of FIG. 2;

FIG. 5 is a side elevational view of the snap ring shown in FIG. 4.

Figure 1:
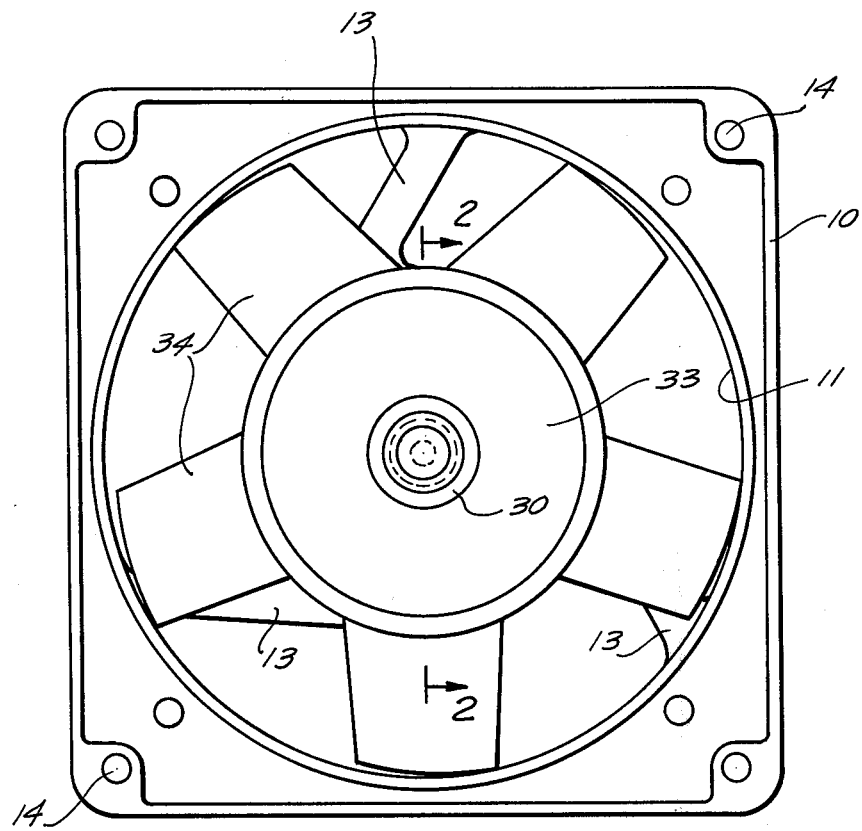
FIG. 1 is a front elevational view of a fan of the type to which this invention relates.

The fan chosen to illustrate this invention includes a frame 10 comprising a square outer portion provided with a central circular opening 11, and a motor support 12 held at the center of the opening 11 by a number of struts 13 extending between the support 12 and the outer portion of the frame. If desired, the entire frame, can be formed as a single casting. At its corners, the frame 10 is provided with holes 14 for accommodating suitable fasteners (not shown). By means of these fasteners, the frame can be mounted in or near a region in which air is to be circulated.

The motor support 12 is a circular, cup-like element having a central bore 15. One end of a stationary cylindrical shaft 18 is fixed in the bore 15, by any suitable means such as a cement or cast metal 16, and the balance of the shaft 18 projects from the support 12 in cantilever fashion. The shaft, in effect, serves as an extension of the frame 10 upon which the impeller of the fan is rotatably supported.

The impeller is rotated by an induction motor comprising a stator 20 and a rotor 21. The stator 20 is a generally annular shaped body having a central bore 22, and is fixed within the motor support 12 by suitable fastening means, such as the screws 23. The stator is provided with the usual field windings (not shown) which may be energized from any suitable source of electrical current. The rotor 21 is an annular body located within the bore 22 of the stator, but unconnected to the stator. Fixed to the inner surface of the rotor is an axially-extending sleeve 26 formed of stainless steel or other similar material, which rotates with the rotor 21. The interior of sleeve 26 is machined to enlarge the internal diameter of the sleeve near its ends thereby defining two endwise-facing shoulders 27 and 28, the purpose of which will be seen below.

Fixed to the outer surface of sleeve 26, near its end edge 29 farthest from the end of shaft 18 fixed in securing means 16, is a generally cylindrical extension 30 surrounding and projecting beyond sleeve end 29. The internal diameter of part of extension 30 is increased so that an annular space 31 is provided between extension 30 and the end portion of sleeve 26 adjacent to end edge 29. One end of extension 30 is formed with an outwardly projecting flange 32.

Figure 4:
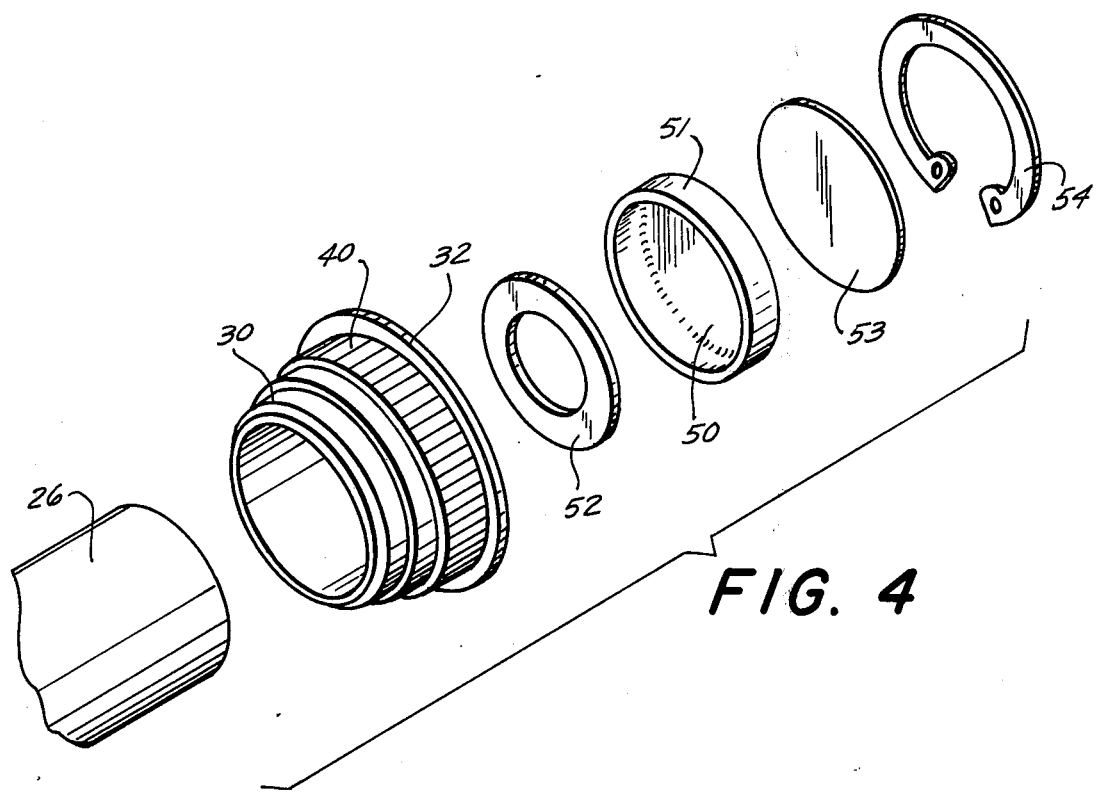
FIG. 4 is a perspective exploded view of the end of the sleeve farthest from the fixed end of the shaft, and the parts associated with that sleeve end.

The impeller of the fan comprises a generally cup-shaped hub 33 formed with radially projecting blades 34. At the center of its front wall, the hub presents an inwardly projecting collar 35 adapted to fit snugly over the extension 30, and abut against flange 32. The collar is secured to the extension by a tight friction fit between the internal surface of the collar 35 and the roughened outer surface portion 40 (see FIG. 4) of extension 30 adjacent to flange 32. Preferably the hub 33, blades 34, and collar 35 are integrally formed of, for example, a suitable molded plastic. When the impeller is in place, as shown in FIG. 2, the side walls of the hub 33 terminate close to the side walls of the motor support 12, whereby the hub and motor support form a housing for the induction motor.

Between the sleeve 26 and shaft 18 are a pair of ball bearings 36 and 37. The inner race 38 of each bearing is fixed to the shaft 18, and therefore remains stationary, and the outer race 39 of each bearing is fixed to the inner surface of the sleeve 26, and therefore rotates with the sleeve. The inner stationary race 38 of the bearing 36 abuts a boss 42, formed by the cement or cast metal 16. The bearing 36 is maintained in this position by shoulder 27 which abuts the opposite side of the outer race 39. By virtue of the arrangement just described, there is no relative movement between the bearing 36 and the boss 42, or between the bearing 36 and the shoulder 27.

The outer race 39 of bearing 37 is spaced from shoulder 28 by a series of alternating spring washers 43 and flat washers 44. Bearing 37 is maintained in this position by a washer 45 and snap ring 46, the latter being seated in a channel 47 formed in shaft 18. In assembling the fan parts, bearing 36 is first mounted on shaft 18 in abutment with boss 42. Then, sleeve 26, carrying impeller 33, 34, is slipped over shaft 18 until shoulder 27 abuts outer race 39 of bearing 36. Washers 43 and 44 are then slipped over shaft 18 and bearing 37 is mounted on the shaft, the spring washers 43 being compressed by longitudinal movement of bearing 37 on to the shaft. Bearing 37 is moved far enough on to the shaft to permit snap ring 46 to be snapped into channel 47 with washer 45 between the snap ring and bearing. Use of spring washers 43, which are resilient in the longitudinal direction of the shaft, insures that the bearings are held secure against their various abutments.

The end portion of sleeve 26 adjacent end edge 29 is closed by a cup-shaped cap 50, the inturned rim 51 of the cap fitting loosely within annular space 31. Arranged between cap 50 and sleeve end edge 29 is a gasket 52 of resilient material. While any suitable rubber-like material can be used to fabricate gasket 52, a fluorocarbon elastomer sold by du Pont under the trademark Viton Fairprene has been found particularly advantageous. Arranged against the outer face of cap 50 is a thin plate 53, which may bear a trademark or some other indicia relating to the fan. Gasket 52, cap 50, and plate 53 are held in place by a snap ring 54 (FIGS. 3–5) seated within a channel 55 formed in the internal surface of extension 30.

It will be noted that between the bearings 36 and 37, an annular space 49 is defined by the outer surface of the shaft 18 and the inner surface of the sleeve 26. This annular space is employed as a reservoir for a suitable lubricant, such as grease which is always in direct contact with the bearings 36 and 37. Consequently, the grease is continuously fed to the bearings. This action may be enhanced, if desired, by introducing the grease into the annular reservoir under a slight pressure. The diameter of the shaft 18 is reduced in the region between the bearings in order to increase the spacing between the shaft and the sleeve 26 and thereby increase the capacity of the grease reservoir.

The enclosed space 56 defined by the cap 50, the end portion of the sleeve 26 adjacent to the end edge 29, the bearing 37, and the free end of the shaft, is also filled with grease and thereby serves as a supplemental grease reservoir for supplying the bearing 37 with lubricant.

Snap ring 54 is formed of a springy material, such as a metal, and in its unstressed condition has a curved profile when viewed from the side, as shown in FIG. 5. As indicated in FIG. 3, channel 55 is wider than the thickness of snap ring 54. Hence, when snap ring 54 is seated in channel 55, and in engagement with plate 53, snap ring 54 presses against plate 53 in a leftward direction in FIG. 3. As a result, cap 50 is pressed leftwardly, and gasket 52 is squeezed tightly between sleeve end edge 29 and cap 50. In this way, a lubricant-tight seal is provided for the space 56 between the sleeve and cap.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

What is claimed is:
1. An electrically driven fan comprising
   a. a frame,
   b. a motor having a stator fixed to said frame and an annular shaped rotor rotatable with respect to said stator and frame,
   c. a stationary shaft fixed at one end to said frame and projecting in cantilever fashion therefrom,
   d. a sleeve fixed within said rotor and rotatable therewith, said sleeve surrounding said shaft, one end of said sleeve being closer to the fixed end of said shaft and the other being farther from said fixed end, and said sleeve being of such length that its farther end is located even with or beyond the free end of said shaft,
   e. an extension fixed to said sleeve near its farther end, said extension surrounding and being radially spaced from said farther sleeve end,
   f. a fan impeller fixed to said extension,
   g. a pair of ball bearings between said sleeve and said shaft, the inner races of said bearings being fixed to said stationary shaft and the outer races being fixed to said sleeve and rotatable therewith, said bearings being spaced apart along the length of said shaft,
   h. a cup-shaped cap within said extension and fitted over said farther end of said sleeve,
   i. a resilient gasket between the end edge of said sleeve at its farther end and said cap, said gasket contacting both said sleeve end edge and said cap, and
   j. means within said extension resiliently urging said cap toward said end edge of said sleeve so as to press said gasket between said sleeve end edge and said cap.

2. An electrically driven fan as defined in claim 1 wherein said means (j) includes a channel in the inner surface of said extension; and a resilient snap ring within said channel; said snap ring having a curved profile, when viewed from the side, in its unstressed condition; and the width of said channel exceeding the thickness of said snap ring.

3. An electrically driven fan as defined in claim 1 including two shoulders formed integrally on the inner surface of said sleeve serving as abutments for said bearing outer races to limit the movement of said bearings toward each other.

4. An electrically driven fan as defined in claim 3 including resilient means between said shoulder closer to the free end of said shaft and its respective bearing race.

* * * * *